United States Patent
Klein

[15] 3,691,483
[45] Sept. 12, 1972

[54] PHASED ARRAY LASER SOURCE
[72] Inventor: Aaron David Klein, 261 Congressional Lane, Rockville, Md. 20852
[22] Filed: Feb. 9, 1970
[21] Appl. No.: 14,823

[52] U.S. Cl. .................332/7.51, 331/94.5, 350/160
[51] Int. Cl. ...........................H01s 3/02, H04b 9/00
[58] Field of Search .......332/7.51; 330/4.3; 343/778; 331/94.5; 350/160, 285

[56] References Cited

UNITED STATES PATENTS

| | | | |
|---|---|---|---|
| 3,590,248 | 6/1971 | Chatterton | 250/199 |
| 3,517,337 | 6/1970 | Shah | 350/160 |
| 3,515,458 | 6/1970 | Korpel | 350/160 |
| 3,506,334 | 4/1970 | Korpel | 350/160 |
| 3,519,953 | 7/1970 | Gamblin et al. | 331/94.5 |
| 3,484,713 | 12/1969 | Fenner | 331/94.5 |
| 3,465,159 | 9/1969 | Stern | 330/4.3 |
| 3,504,302 | 3/1970 | Fenner | 332/7.51 |
| 3,331,651 | 7/1967 | Sterzer | 350/96 |
| 3,284,799 | 11/1966 | Ross | 343/6 |

Primary Examiner—Benjamin A. Borchelt
Assistant Examiner—N. Moskowitz
Attorney—R. S. Sciascia and Thomas O. Watson, Jr.

[57] ABSTRACT

This invention is directed to an electronically scanned laser array. It utilizes a phase-locking laser, an array of variable phase shifters, an array of semiconductor lasers and a control computer. The output of the phase-locking laser is optically coupled, by means of reflective or transmission optics, to the phase shifters which are controlled in a predetermined pattern by the computer. The phase shifters are optically coupled to the array and cause uniform shifts in the phase front of the arrayed lasers to provide a scanning effect of the output beam.

5 Claims, 3 Drawing Figures

PATENTED SEP 12 1972　　　　　　　　3,691,483

INVENTOR.
AARON DAVID KLEIN
BY Thomas O. Watson Jr.
ATTORNEY ial output is to sweep through a given angle.
PHASED ARRAY LASER SOURCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to laser scanning and, more particularly, it relates to electronic scanning of the coherent light output of an array of semiconductor lasers. The invention has application in optical radar systems and holography as well as in addresses for optical storage systems.

Laser scanning in the prior art was achieved mechanically by rotating mirrors and by the use of opto-acoustic crystals which utilize ultrasonic waves to bend the laser beam. The scanning in these methods, however, is slow and they are not readily adaptable to automatic control.

Prior art electronic laser scanning systems only use a single laser. The laser beam is seperated into a plurality of portions by fiber optics and a phase-shift is applied to each portion. The plurality of beam portions are then converged by fiber optics. This system, however, has a number of disadvantages. The laser employed must be a high power output laser, or else the phase shifted output will be low power and not readily utilizable. The optical phase shifters employed must thus be capable of withstanding a high power beam. Further, placing the optical phase shifters in a position where they operate on the beam just prior to utilization is undesirable. Phase shifters so placed will cause scattering, distortion and feedback into the laser generating the beam.

SUMMARY OF THE INVENTION

The inventive system represents a substantial improvement over the prior art. It causes the electronic scanning of the coherent light output of an array of lasers without subjecting the optical phase shifters to a high power beam while producing a more highly coherent beam. The inventive system is also more compact and efficient than any of the prior art systems.

The inventive system utilizes a master optical maser or laser oscillator to provide phase-locking light beams as inputs for an array of semiconductor lasers. The master laser beam is fed to an array of optical phase shifters by means of mirrors or lenses. Each optical phase shifter provides a predetermined phase shift to its received beam and passes it one to its respective semiconductor laser in the array. The optical phase shifters are automatically controlled by a computer and shift the relative phase of their respective incoming beams. This phase shifting is controlled to cause the laser array output to sweep through a given angle.

By using an array of semiconductor lasers, the system overcomes the power and distortion problems involved when a single laser is used. The semiconductor lasers are also extremely efficient and compact. In addition, the phase shift effect can be achieved in the semiconductor laser structure itself, thereby eliminating the space taken by external phase shifters.

OBJECTS OF THE INVENTION

It is therefore an object of the present invention to provide a new and improved apparatus for electronically scanning a laser beam.

It is a further object of the present invention to provide an apparatus for scanning a laser beam which is highly efficient and compact.

It is a still further object of the present invention to provide an apparatus for electronically scanning a laser beam in which the lasing and phase shifting occur within the same structure.

Other objects, advantages and novel features of the invention will become apparent from the following detailed description of the invention when considered in conjunction with the accompanying drawings.

DESCRIPTION OF THE PREFERRED EMBODIMENT

Figure 1:
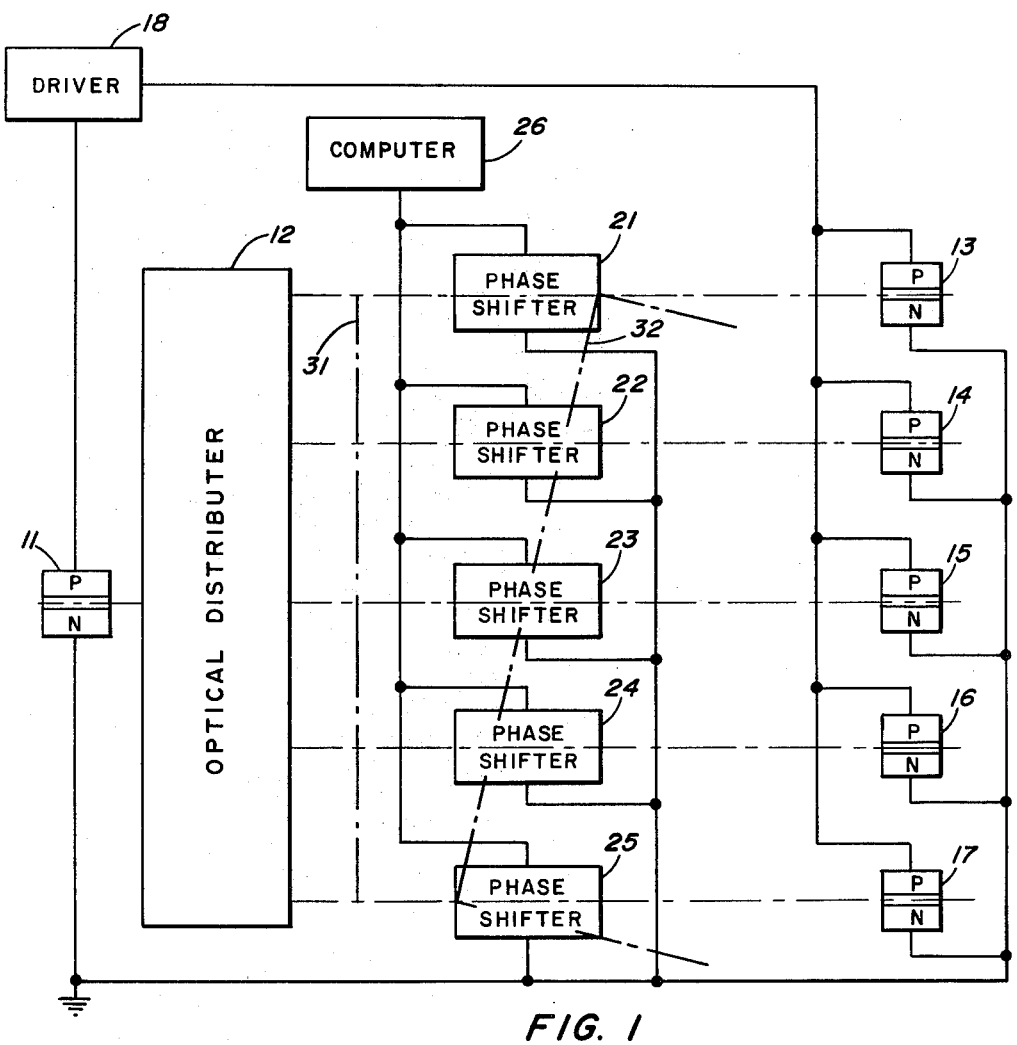
FIG. 1 is a schematic of the inventive system.

Referring now to FIG. 1, the inventive system utilizes a master optical maser or laser 11 as a light source. The output of laser 11 is distributed to the optical phase shift array 21–25, which may be planar or non-planar, by means of reflective optics such as mirrors, or coherent transmission optics such as lenses or coherent light tubes. A fiber optics cluster may also be used but with poorer results. Box 12 of FIG. 1 represents either a reflective optics or coherent transmission optics system, both of which are known in the art, to distribute the beam generated by laser 11.

Electro-optical phase shifters 21–25 are automatically controlled by a computer 26. The phase shifters may be any of the well known types such as a Kerr or Pockel cell. The phase shifted beams are fed into the semiconductor laser array 13–17 which is in close proximity to the phase shifter array.

All of the lasers utilized are of the semiconductor type and although FIG. 1 shows junction lasers, it should be noted that bulk-effect, electronic beam or any similar type of semiconductor laser may be utilized. Semiconductor lasers were chosen because they are highly efficient and compact.

All of the lasers are controlled by a driving circuit 18. The driving circuit can either provide pulses or a continuous excitation.

Figure 3:
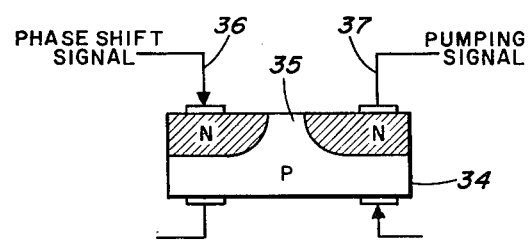
FIG. 3 illustrates schematically a semiconductor laser that will accomplish both phase shifting and coherent light generation.

In optimum space applications the phase shift can be accomplished by using the laser semiconductor structure shown in FIG. 3. By utilizing dual function semiconductor laser 34, which is well known in the art, in the manner shown, phase shift and coherent light generation is accomplished in the same package. The semiconductor laser 34 which may be made of galium arsenide is divided into two sections by notch 35. By varying the reverse bias 36 of one side of such a semiconductor laser variation of the phase shift of an incoming signal is accomplished. Varying the forward bias 37 of the other side results in amplification of the incoming signal or oscillation at the frequency of the incoming signal.

Figure 2:
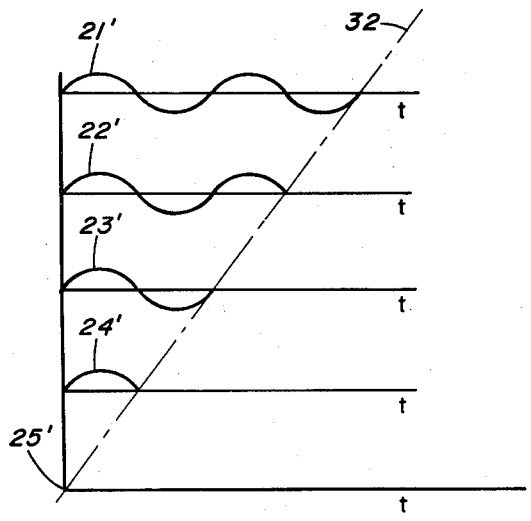
FIG. 2 shows a phase shift applied to the phase shifter array.

In operation, the driver 18, when turned on, generally applies a continuous current to lasers 11 and 13 to 17. The output of the master laser 11 is optically coupled through optical distributer 12 to the phase shifter array 21–25. which is controlled by computer 26. FIG. 2 shows the phasefront 32 obtained at the outputs of 21 to 25 when a 180° relative phase shift is applied by the phase shifters to wavefront 31. The sinusoidal outputs of the phase shifters are designated by the numerals 21' to 25'.

The computer is programmed to maintain a constant relative phase difference between the outputs of adjacent phase shifters. The computer generally is operative to apply a signal to the phase shifters which will vary this relative phase difference in increasing steps from a minimum to a maximum which is dictated by the size and number of phase shifters utilized.

As the relative phase of each phase shifter is shifted, the beam will assume a deflected position as a result of the cancellation and adding of the plurality of differently phased light beams. By varying the relative phases in incremental sequential steps, a scanning of the projected light beam is accomplished. In view of practical considerations such as the size and number of phase shifters, a scanning angle of 120° is possible in the present state of the equipment art.

The phase front 32 is imposed on laser array 13–17. The laser array 13–17 is located in very close proximity to the phase shifter array 21–25 so that no interaction of the individual light beams occurs until they leave the laser array 13–17. By utilizing dual function semiconductor laser 34 of FIG. 3, the location of the phase shifter array relative to the laser array is inherently solved.

Semiconductor lasers 13–17 may be pumped by driver 18 below their lasing threshold so that the power of the beam generated by laser 11 will be sufficient, in combination with the pumping energy supplied by driver 18, to cause the respective lasers within the array to generate an amplified light beam. This manner of operation is analogous to the function of an amplifier. The beam outputs of the respective semiconductor lasers in the array will be locked into the phase of the input signal because main laser 11 is of the same signal characteristics as the individual lasers of the array. A theoretical explanation for the occurrence of this observed phenomena is not available at this time. However, its occurrence is known in the art.

If the individual lasers within the array 13–17 are pumped above the lasing threshold by driver 18, they will generate coherent light in an oscillatory manner, in the same manner as main laser 11. When the light beam from the phase shifter array 21–25 impinges on the respective lasers within the array, the power of the output light beam from each respective laser within the array will not change greatly. However, the output beam of each respective laser will be phase locked into the phase of the input to the laser. Prior to the beam from the phase shifter array 21–25 impinging on the respective lasers in the array, each laser within the array would be oscillating with a nondetermined indiscriminate relative phase.

Upon leaving laser array 13–17, the individual beams with their controlled relative phase shifts interact to create a beam that is deflected in a predetermined direction. By sequentially changing the relative phase relationship of the array via the computer 26 and the phase shifter array 21–25, the beam is scanned.

Thus, it is seen that a new and improved apparatus for electronically scanning a laser beam has been provided. The inventive system utilizes an array of semiconductor lasers to provide a high powered output in a compact and efficient manner.

Obviously many modifications and variations of the present invention are possible in the light of the above teachings.

What is claimed is:

1. An apparatus for electronically scanning a beam of coherent light comprising:
   a driver means;
   a first source of coherent light pumped by said driver means;
   an array of electro-optic phase-shifting means having an optical input and output, and operative to produce, at its optical output, a beam of light which is phase shifted from a beam of light impinging on its optical input;
   optical coupling means for optically coupling the output of said first source to the input of each of said phase-shifting means in the array;
   an array of second sources of coherent light pumped by said driver means and individually coupled to the corresponding optical output of said array of phase shifting means to amplify the received light;
   each of said phase-shifting means and its corresponding second source of coherent light are embodied within a single dual function laser means, and a plurality of the dual function laser means form said array;
   phase locking means for holding the first and second sources of coherent light phase locked;
   automatic control means connected to said electro-optic phase shifting means for varying the phase shift applied by said phase-shifting means.

2. The apparatus of claim 1 wherein said phase locking means comprises said driving means pumping said first and second sources of coherent light simultaneously.

3. The apparatus of claim 1 wherein said first and second sources of coherent light comprises semiconductor lasers.

4. The apparatus of claim 1 wherein said dual function laser means comprises a semiconductor laser structured to accept electrical phase shift signals and pumping signals along with light signals.

5. The apparatus of claim 4 wherein said automatic control means varies the signals applied to said plurality of dual function laser means to systematically vary the relative phase shift applied to the output of said first source of coherent light whereby scanning of the output of said array of dual function laser means occurs.

* * * * *